(12) United States Patent
Gallo Olalla (10) Patent No.: US 10,086,948 B2
(45) Date of Patent: Oct. 2, 2018

(54) METHOD FOR OPTIMUM MAXIMUM RANGE CRUISE SPEED IN AN AIRCRAFT

(71) Applicant: The Boeing Company, Chicago, IL (US)

(72) Inventor: Eduardo Gallo Olalla, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/059,037

(22) Filed: Mar. 2, 2016

(65) Prior Publication Data
US 2016/0257420 A1 Sep. 8, 2016

(30) Foreign Application Priority Data
Mar. 4, 2015 (EP) .................................. 15382092

(51) Int. Cl.
*G05D 1/00* (2006.01)
*B64D 45/00* (2006.01)
(Continued)

(52) U.S. Cl.
CPC ............. *B64D 45/00* (2013.01); *B64D 31/00* (2013.01); *G01P 3/00* (2013.01); *G05D 1/0005* (2013.01)

(58) Field of Classification Search
CPC ................................. B64D 45/00; B64D 31/00
See application file for complete search history.

(56) References Cited

U.S. PATENT DOCUMENTS 3,612,837 A * 10/1971 Brandau .................. G06G 7/70
701/123
4,312,041 A 1/1982 DeJonge
(Continued)

FOREIGN PATENT DOCUMENTS

EP 0082661 6/1983
EP 0082661 A1 6/1983
(Continued)

OTHER PUBLICATIONS

Reachability of Optimal Cruise Conditions: by German, Patterson, and Takahashi. Published on Jan. 2012 in50th AIAA Aerospace Sciences Meeting including the New Horizons Forum and Aerospace Exposition.*

(Continued)

*Primary Examiner* — Jess Whittington
(74) *Attorney, Agent, or Firm* — Kunzler, PC (57) ABSTRACT

A method for calculating an optimum maximum range cruise speed in an aircraft and its use is disclosed herein. The method includes receiving a plurality of flight parameters including weight of the aircraft, an aircraft bearing and an atmospheric pressure, an atmospheric temperature, a wind speed and a wind bearing at the altitude of the aircraft; calculating a weight coefficient of the aircraft, a wind Mach number and an absolute value of a difference between the wind bearing and the aircraft bearing. Additionally, the method includes calculating an optimum Mach number of the aircraft, which provides the optimum maximum range cruise speed. The calculation of the optimum Mach number includes the weight coefficient, the wind Mach number, and the absolute value of the difference between the wind bearing and the aircraft bearing.

18 Claims, 2 Drawing Sheets

(51) Int. Cl.
B64D 31/00 (2006.01)
G01P 3/00 (2006.01)

(56) References Cited

U.S. PATENT DOCUMENTS

| | | | | |
|---|---|---|---|---|
| 8,193,948 | B1* | 6/2012 | Shapiro | G08G 5/065 |
| | | | | 340/945 |
| 9,536,435 | B1* | 1/2017 | Shay | G08G 5/045 |
| 2007/0032921 | A1 | 2/2007 | Allen | |
| 2009/0177339 | A1* | 7/2009 | Chen | G05D 1/0005 |
| | | | | 701/3 |
| 2010/0152927 | A1* | 6/2010 | Sacle | G05D 1/0005 |
| | | | | 701/3 |
| 2014/0257598 | A1* | 9/2014 | Bailey | G05D 1/101 |
| | | | | 701/3 |
| 2016/0069688 | A1* | 3/2016 | Polansky | G05D 1/0005 |
| | | | | 701/3 |
| 2016/0260333 | A1 | 9/2016 | Gallo Olalla | |

FOREIGN PATENT DOCUMENTS

| | | |
|---|---|---|
| EP | 0212619 | 3/1987 |
| EP | 0212619 A2 | 3/1987 |
| EP | 2623943 A1 | 8/2013 |

OTHER PUBLICATIONS

European Search Report for EP Application No. 15382092.3 dated Nov. 19, 2015.
Bert, Charles W., Prediction of Range and Endurance of Jet Aircraft at Constant Altitude, Journal of Aircraft, Oct. 1981, pp. 890-892, vol. 18, No. 10.
Torenbeek, et al., Generalized Maximum Specific Range Performance, Journal of Aircraft, Jul. 1983, pp. 617-622, vol. 20, No. 7.
Martinez-Val, et al., Optimum Cruise Lift Coefficient in Initial Design of Jet Aircraft, Journal of Aircraft, May 1991, pp. 712-714, vol. 29, No. 4.
Miller, L. Earl, Optimal Cruise Performance, Journal of Aircraft, May-Jun. 1993, pp. 403-405, vol. 30, No. 3.
Hale, et al., Effects of Wind on Aircraft Cruise Performance, Journal of Aircraft, Jan. 1978, pp. 382-387, vol. 16, No. 6.
Rivas, et al., An analysis of maximum range cruise including wind effects, Aerospace Science and Technology 14, 2010, pp. 38-48.
German, et al., Reachability of Optimal Cruise Conditions, 50th AIAA Aerospace Sciences Meeting, Jan. 12, 2012, pp. 1-20.
Extended European Search Report for EP Application No. 15382092.3 dated Nov. 19, 2015.
Extended European Search Report for EP Application No. 15382093.1 dated Nov. 13, 2015.

* cited by examiner

METHOD FOR OPTIMUM MAXIMUM RANGE CRUISE SPEED IN AN AIRCRAFT

FIELD

The present disclosure relates to a method for calculating an optimum maximum range cruise speed in an aircraft, and more specifically, optimization of range cruise speed which maximizes the aircraft range for given conditions.

BACKGROUND

The optimum Maximum Range Cruise (MRC) speed is the speed value which maximizes an aircraft range, for given atmospheric conditions and fuel load, while maintaining the altitude, which is equivalent to minimizing the fuel consumption to reach a certain distance for the given atmospheric conditions. Maximizing the aircraft range includes obtaining the optimum Mach number for a given altitude. Generally the given altitude is provided by an Air Traffic Control (ATC) entity.

Solutions for optimizing maximum range are generally focused on aircraft preliminary design instead of actual flight management system (FMS) implementation or trajectory prediction. Such aircraft preliminary design solutions contain significant simplifications such as ignoring factors (e.g., wind, parabolic drag polar, and constant thrust specific fuel consumption (TSFC)) that make the results inappropriate for the operational use thereof.

SUMMARY

The subject matter of the present application has been developed in response to the present state of the art, and in particular, in response to the shortcomings of conventional solutions for optimizing the maximum range of an aircraft, which have not yet been fully solved by currently available techniques. Accordingly, the subject matter of the present application has been developed to provide apparatuses, systems, and methods for optimizing the maximum range of an aircraft, that overcome at least some of the above-discussed shortcomings of prior art techniques. According to some embodiments, disclosed herein is a method, system, and computer program product for calculating an optimum maximum range cruise speed in an aircraft and the use thereof, and method for controlling an aircraft to fly at the optimum maximum range cruise speed. The method of the present disclosure provides a significant improvement over existing solutions as it takes into account the influence of the crosswind for calculating the optimum Mach number (that will provide the maximum aircraft range), in addition to also considering a realistic drag polar that includes the compressibility effects and fuel consumption dependencies with speed and thrust. Another advantage of the present disclosure is a method for controlling an aircraft to fly at an optimum maximum range cruise speed as calculated above.

In one embodiment, a method for calculating an optimum maximum range cruise speed in an aircraft is disclosed. This method includes receiving a plurality of flight parameters including at least a weight of the aircraft, an aircraft bearing and an atmospheric pressure, an atmospheric temperature, a wind speed, and a wind bearing at the altitude of the aircraft. A weight coefficient of the aircraft is calculated based on at least the weight of the aircraft and the atmospheric pressure at the altitude of the aircraft. Also calculated are a wind Mach number and an absolute value of a difference between the wind bearing and the aircraft bearing. An optimum Mach number of the aircraft is calculated, which provides the optimum maximum range cruise speed, wherein the calculation further comprises the weight coefficient, the wind Mach number, and the absolute value of the difference between the wind bearing and the aircraft bearing.

According to certain implementations of the method, the Mach number of the aircraft/wind is the division of the speed (of the aircraft or wind respectively) between the speed of sound, and where the speed of sound is a function of the atmospheric temperature.

In yet certain implementations of the method, the fuel load of the aircraft may be dynamically and continuously measured in order to calculate the weight of the aircraft. The weight of the aircraft depends directly on the current fuel load, so there is a direct link between the remaining fuel load and the calculated optimum speed. Even if it were to be assumed that the wind conditions and the direction of the aircraft had not changed during flight, the aircraft weight reduction, due to the fuel consumption, would change the weight coefficient and then the optimum speed of the aircraft.

According to some implementations of the method, the atmospheric pressure at the altitude of the aircraft may also be dynamically and continuously measured in order to calculate the altitude of the aircraft. The present atmospheric pressure at a point in time along a flight path of the aircraft will depend on the altitude of the aircraft. Note that when the altitude of the aircraft is mentioned, it is referring to the pressure altitude instead of the geometric altitude.

In yet some implementations of the method, the calculation of the optimum Mach number may further include considering a realistic drag polar that includes compressibility effects and fuel consumption dependencies with aircraft speed and aircraft thrust. The drag polar represents the aerodynamic behavior of the aircraft, while the fuel consumption is based on the aircraft engine performance characteristics. The drag polar is the relationship between the lift on an aircraft and its drag, expressed in terms of the dependence of the lift coefficient on the drag coefficient. In a first approximation a "parabolic" polar is used, implying that the drag coefficient (Cd) is proportional to the squared lift coefficient (Cl). This first approximation implies the introduction of calculation errors. In a second approximation the compressibility effects are included in order to obtain a realistic drag polar, such that the drag coefficient depends on the lift coefficient and on the Mach number. Further to the fuel consumption, this parameter in a first approach is usually considered as proportional to the engine thrust. In a second approximation, the influence of the actual aircraft speed in the fuel consumption is also considered in order to obtain realistic fuel consumption.

According to some implementations, the whole method is dynamically and continuously performed.

In certain implementations, the method may be carried out by a flight management system of the aircraft.

In yet some implementations of the method, the calculated optimum Mach number may be followed by the aircraft guidance and control system.

According to some implementations of the method, the calculation of the optimum Mach number comprises using the following equation:

$$R = \int_{C_{W0}}^{C_{Wi}} \frac{M \cos(\chi_{TAS} - \chi) + M_{WIND}\cos(|\chi_{WIND} - \chi|)}{\frac{F}{m_{MTOW} a_0 \delta \sqrt{\theta}}} dC_W$$

wherein R is the aircraft range, CW is the weight coefficient of the aircraft, $|x_{WIND}-x|$ is the absolute value of the difference between the wind bearing and the aircraft bearing, M is a current Mach number of the aircraft, $x_{TAS}$ is an airspeed yaw angle, x is a ground speed yaw angle, $M_{WIND}$ is the wind Mach number, $x_{WIND}$ is a wind speed yaw angle, $m_{MTOW}$ is a maximum takeoff weight of the aircraft, $a_0$ is a standard speed of sound at mean sea level, F is an instant fuel consumption of the aircraft, $\delta$ is an atmospheric pressure ratio, and $\theta$ is an atmospheric temperature ratio.

In another embodiment, disclosed is a method for controlling an aircraft to fly at the optimum maximum range cruise speed calculated according to the methods disclosed herein. The method includes sending the optimum Mach number of the aircraft calculated to the aircraft guidance and control system for adapting the instant speed of the aircraft to the calculated optimum maximum range cruise speed.

In another embodiment, disclosed is a use of the method for calculating an optimum maximum range cruise speed in an aircraft, disclosed previously, in ground trajectory predictors and more specifically in ground trajectory predictors that cannot depend on proprietary aircraft performance data. These ground trajectory predictors are generally based on public aircraft performance models. The method can include sending the optimum Mach number of the aircraft calculated to a ground trajectory predictor, wherein the ground trajectory predictor is configured to predict a trajectory of the aircraft at the optimum Mach number.

In yet other embodiments, disclosed are a flight management system, an aircraft including the flight management system, and a computer readable medium having stored therein a computer program that causes a computer to perform the methods of the present disclosure.

According to one embodiment, an aircraft includes an engine that is configured to generate thrust for the aircraft. The aircraft also includes a guidance and control system configured to control a speed of the aircraft by controlling the thrust generated by the engine. Additionally, the aircraft includes a flight management system that includes a computer programmed to receive a plurality of flight parameters including at least a weight of the aircraft, an aircraft bearing and an atmospheric pressure, an atmospheric temperature, a wind speed and a wind bearing at the altitude of the aircraft. The computer is also programmed to calculate a weight coefficient of the aircraft based on at least a weight of the aircraft and the atmospheric pressure at the altitude of the aircraft, calculate a wind Mach number, calculate an absolute value of a difference between the wind bearing and the aircraft bearing, and calculate an optimum Mach number of the aircraft. The optimum Mach number provides the optimum maximum range cruise speed. The calculation further includes the weight coefficient, the wind Mach number, and the absolute value of the difference between the wind bearing and the aircraft bearing. The guidance and control system is further configured to adapt the speed of the aircraft to the optimum maximum range cruise speed.

In some implementations of the aircraft, the calculation of the optimum Mach number further includes considering a realistic drag polar that includes compressibility effects and fuel consumption dependencies with aircraft speed and aircraft thrust. In certain implementations of the aircraft, the calculation of the optimum Mach number further includes determining an instantaneous optimum Mach number as a function of the weight coefficient, the wind Mach number, and the absolute value of the bearing difference between the wind and the aircraft path.

According to certain implementations of the aircraft, a calculating the optimum Mach number comprises using the following equation:

$$R = \int_{C_{W0}}^{C_{Wi}} \frac{M\cos(x_{TAS}-x) + M_{WIND}\cos(|x_{WIND}-x|)}{\frac{F}{m_{MTOW}a_0\delta\sqrt{\theta}}} dC_W$$

wherein R is the aircraft range, $C_W$ is the weight coefficient of the aircraft, $|x_{WIND}-x|$ is the absolute value of the difference between the wind bearing and the aircraft bearing, M is a current Mach number of the aircraft, $x_{TAS}$ is an airspeed yaw angle, x is a ground speed yaw angle, $M_{WIND}$ is the wind Mach number, $x_{WIND}$ is a wind speed yaw angle, $m_{MTOW}$ is a maximum takeoff weight of the aircraft, $a_0$ is a standard speed of sound at mean sea level, F is an instant fuel consumption of the aircraft, $\delta$ is an atmospheric pressure ratio, and $\theta$ is an atmospheric temperature ratio.

In yet another embodiment, a flight management system of an aircraft includes a computer that is programmed to execute operations. The operations include receiving a plurality of flight parameters including at least a weight of the aircraft, an aircraft bearing and an atmospheric pressure, an atmospheric temperature, a wind speed and a wind bearing at the altitude of the aircraft, calculating a weight coefficient of the aircraft based on at least a weight of the aircraft and the atmospheric pressure at the altitude of the aircraft, calculating a wind Mach number, calculating an absolute value of a difference between the wind bearing and the aircraft bearing, and calculating an optimum Mach number of the aircraft, which provides the optimum maximum range cruise speed, wherein the calculation further includes the weight coefficient, the wind Mach number, and the absolute value of the difference between the wind bearing and the aircraft bearing.

In some implementations of the flight management system, the calculation of the optimum Mach number further includes considering a realistic drag polar that includes compressibility effects and fuel consumption dependencies with aircraft speed and aircraft thrust.

According to certain implementations of the flight management system, the calculation of the optimum Mach number further comprises determining an instantaneous optimum Mach number as a function of the weight coefficient, the wind Mach number, and the absolute value of the bearing difference between the wind and the aircraft path.

In certain implementations of the flight management system, calculating the optimum Mach number comprises using the following equation:

$$R = \int_{C_{W0}}^{C_{Wi}} \frac{M\cos(x_{TAS}-x) + M_{WIND}\cos(|x_{WIND}-x|)}{\frac{F}{m_{MTOW}a_0\delta\sqrt{\theta}}} dC_W$$

wherein R is the aircraft range, $C_W$ is the weight coefficient of the aircraft, $|x_{WIND}-x|$ is the absolute value of the difference between the wind bearing and the aircraft bearing, M is a current Mach number of the aircraft, $x_{TAS}$ is an airspeed yaw angle, x is a ground speed yaw angle, $M_{WIND}$ is the wind Mach number, $x_{WIND}$ is a wind speed yaw angle, $m_{MTOW}$ is a maximum takeoff weight of the aircraft, $a_0$ is a standard speed of sound at mean sea level, F is an instant fuel consumption of the aircraft, δ is an atmospheric pressure ratio, and θ is an atmospheric temperature ratio.

According to some implementations of the flight management system, the computer dynamically and continuously executes the operations.

According to some embodiments, an advantage of the present disclosure over the solutions disclosed in the state of the art includes the proposed method uses a one-step approach to the optimization taking the wind (both along track and cross wind) influence into consideration from the beginning until the end of the flight of the aircraft. Existing methods or algorithms use a two-step approach, in which the first step optimizes in no wind conditions and in the second step a correction due to the wind influence is added. This is intrinsically less efficient than the solution disclosed herein. These existing methods or algorithms provoke FMS implementation issues, problems that are overcome by the one step approach proposed by the present disclosure. An additional advantage of the present disclosure over the solutions disclosed in the state of the art includes, for FMS implementation, the disclosed method provides better results and an intrinsically better approach (directly optimizing for wind is better than optimizing without wind and then correcting for it). As previously described, existing methods and/or algorithms neglect the influence of the crosswind on the optimum speed, and most of them involve other significant simplifications, such as compressibility effects. The present disclosure considers those effects and provides the true optimum speed.

Other advantages of the method herein disclosed are that the method may be utilized by an Air Traffic Management (ATM) stakeholder involved in analysis or operations requiring applications that rely on trajectory prediction, FMS manufacturers, air navigation service providers (ANSP), ground automation manufacturers and airlines, among others.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure relates to a method for calculating an optimum maximum range cruise speed in an aircraft and the use thereof. The method for calculating an optimum maximum range cruise speed in an aircraft is focused on obtaining the Mach number that an aircraft should fly at to minimize the fuel consumption required to reach a certain range when flying at a given flight level. Additionally, the method is based on continuously and dynamically monitoring three flight parameters: the weight coefficient, that is the division of the weight by the atmospheric pressure; the wind Mach number, which is the wind speed divided by the speed of sound; and, the absolute value of the difference between the wind bearing and the aircraft bearing. The method then includes executing an algorithm that returns the optimum Mach number for those specific conditions. As the three input parameters change, the Mach number followed by the aircraft should be updated accordingly. The present disclosure also provides a method for controlling an aircraft to fly at the previously calculated optimum maximum range cruise speed.

Figure 1:
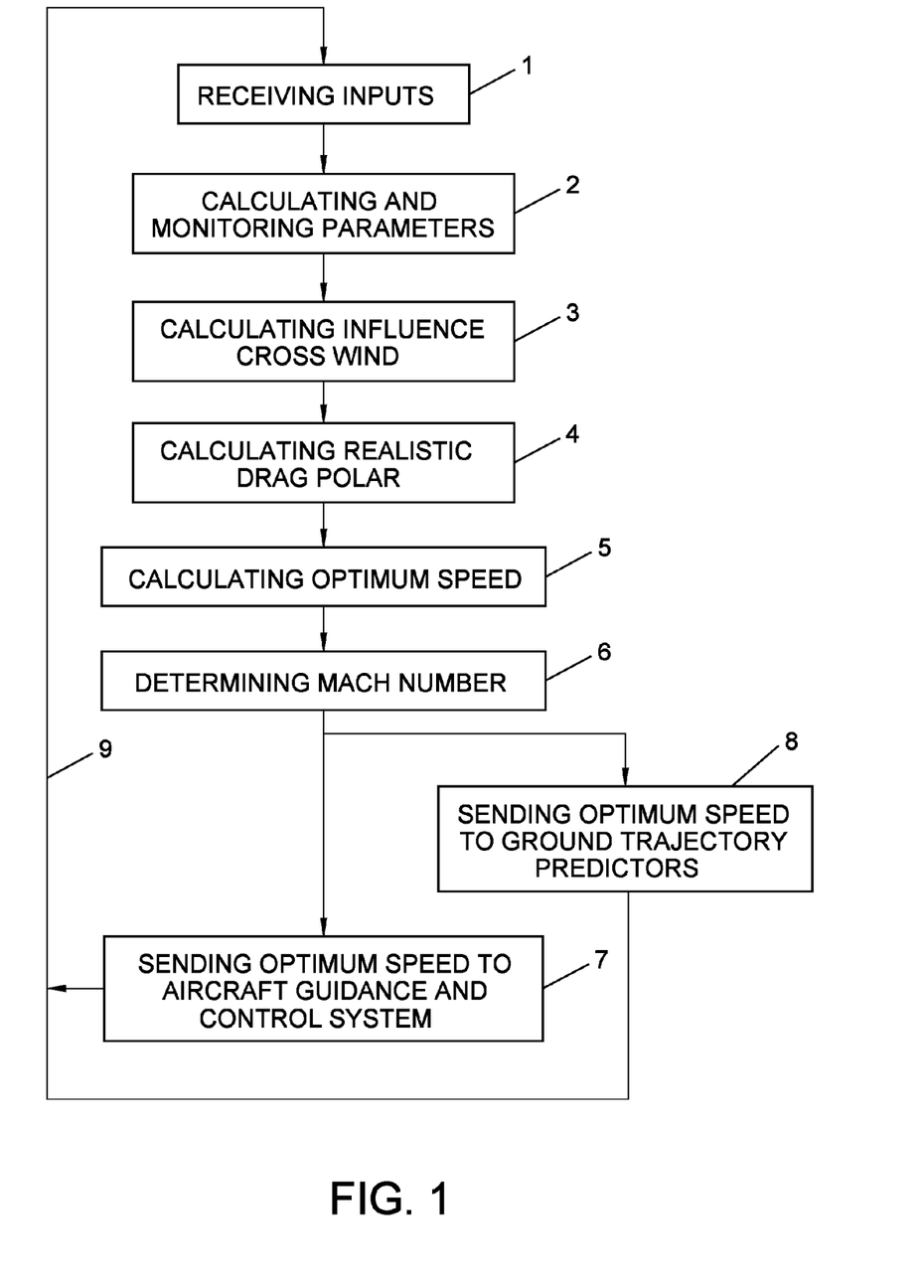
FIG. 1 is a schematic flow diagram of a particular embodiment of a method of calculating an optimum maximum range cruise speed of an aircraft.

FIG. 1 shows a block diagram of a particular embodiment of the method for calculating an optimum maximum range cruise speed in an aircraft. Firstly, the inputs from a plurality of information providers (onboard sensors and external providers) are received (1) by the FMS, which can be a computer module. The inputs include, at least: the current fuel load which is measured by the corresponding sensors, the altitude usually provided by the ATC and the wind conditions provided by a plurality of external sensors such as an anemometer. The atmospheric temperature and pressure are also measured. One or more of these parameters may be continuously updated and received at the FMS. Based on these input parameters, the FMS continuously calculates and monitors (2): the weight coefficient, which is the division of the weight of the aircraft (including fuel weight) by the atmospheric pressure, the wind Mach number, which is the wind speed divided by the speed of sound, and the absolute value of the difference between the wind bearing and the aircraft bearing.

Then, the FMS calculates the influence of the crosswind (3) along track on the optimum Mach number (which results in a maximum range) and the realistic drag polar (4) that includes the compressibility effects, and fuel consumption dependencies with speed and thrust. Once the mentioned parameters have been obtained, the FMS calculates the optimum Maximum Range Cruise (MRC) speed (which maximizes the aircraft range), taking said parameters into account, and determines the aircraft Mach number (6).

The optimum Maximum Range Cruise (MRC) speed may be sent to the aircraft guidance and control system (7) such that the aircraft may follow the calculated optimum MRC, or the MRC can be sent to the ground trajectory predictors (8) in simulation environments.

This method may be dynamically and continuously carried out (9) in order to obtain the actual optimum Maximum Range Cruise (MRC) speed of the aircraft in order to optimize the fuel consumption and therefore to maximize the range cruise speed for a predefined condition. For example, the method may be repeated at predetermined intervals to calculate an updated optimum maximum range cruise speed of the aircraft.

Following, a particular example of an embodiment of the method for calculating an optimum maximum range cruise speed in an aircraft is disclosed, in a detailed manner.

The following nomenclature has been used throughout the example:

$\delta$ Atmospheric pressure ratio
$\gamma$ Air adiabatic index
$\theta$ Atmospheric temperature ratio
$\chi$ Ground speed yaw angle (bearing)
$\chi_{TAS}$ Airspeed yaw angle (bearing)
$\chi_{WIND}$ Wind speed yaw angle (bearing)
0 Initial conditions (sub index)
$a_0$ Standard speed of sound at mean sea level
$C_D$ Drag coefficient
$C_F$ Fuel consumption coefficient
$C_L$ Lift coefficient
$C_T$ Thrust coefficient
$C_W$ Weight coefficient
D Drag force
$g_0$ Standard acceleration of free fall
F Fuel consumption
i Conditions at any point (sub index)
L Lift force
$L_{HV}$ Fuel lower heating value
M Aircraft Mach number
$M_{WIND}$ Wind mach number
m Aircraft mass
$m_{MTOW}$ Maximum Take Off Weight (mass)
p Atmospheric pressure
$p_0$ Standard pressure at mean sea level
R Aerodynamic pressure coefficient, distance (compressibility coefficient)
S Wing Surface
T Thrust force, atmospheric temperature
$T_0$ Standard temperature at mean sea level
$v_G$ Ground speed
$v_{TAS}$ True airspeed
$v_{WIND}$ Wind speed
W Weight force In this particular example, the method uses the following starting relationships to obtain the optimum maximum range cruise speed:

Stationary Cruise Flight

| | |
|---|---|
| L = W | (a1) |
| T = D | (a2) |

Clean Aerodynamics Including Compressibility Effects

| | |
|---|---|
| $D/\delta = r \cdot M^2 \cdot C_D$ | (a3) |
| $L/\delta = r \cdot M^2 \cdot C_L$ | (a4) |
| $r = 0.5 \cdot p_0 \cdot \gamma \cdot S$ | (a5) |
| $C_D = f(M, C_L)$ | (a6) |

Atmospheric Relationships $$\delta = p/p_0 \qquad (a7)$$

$$\theta = T/T_0 \qquad (a8)$$

$$M = \frac{v_{TAS}}{a_0 \cdot \sqrt{\theta}} \qquad (a9)$$

$$M_{WIND} = \frac{v_{WIND}}{a_0 \cdot \sqrt{\theta}} \qquad (a10)$$

Weight Relationships $$W = m \cdot g_0 \qquad (a11)$$

$$C_W = m/\delta \cdot m_{m_{MTOW}} \qquad (a12)$$

Thrust Relationship $$C_T = \frac{T}{\delta} \cdot \frac{1}{m_{MTOW} \cdot g_0} \qquad (a13)$$

Considering the above cited equations, the thrust coefficient "$C_T$" of the aircraft may be set as a function of the Aircraft Mach number "M" and the weight coefficient "$C_W$":

$$C_T = \frac{D}{\delta} \cdot \frac{1}{m_{MTOW} \cdot g_0} = \frac{r \cdot M^2 \cdot C_D(M, C_L)}{m_{MTOW} \cdot g_0} \qquad (a14)$$

$$C_L = \frac{1}{r \cdot M^2} \cdot \frac{W}{\delta} \qquad (a15)$$

$$C_T = f(M, C_W) \qquad (a16)$$

The fuel consumption relationships used, include the generic relationship of the fuel consumption coefficient with the Mach number and the thrust coefficient:

$$C_F = \frac{L_{HV}}{m_{MTOW} \cdot g_0 \cdot a_0} \cdot \frac{F}{\delta\sqrt{\theta}} \quad \text{(a17)}$$

$$C_F = f(M, C_T) \quad \text{(a18)}$$

The dependency of the fuel consumption coefficient $C_F$ with the atmospheric temperature ratio "θ" is in a first approximation the inverse of the square root (−0.5), as shown in equation (a17). This number varies slightly from one aircraft to another.

The ground speed may be defined as the sum of the projection of the airspeed "$v_{TAS}$" and wind speed "$v_{WIND}$" over the aircraft path, while the sum of their projections orthogonal to the path shall always be zero:

$$v_{TAS} \cdot \sin(\chi_{TAS}-\chi) + v_{WIND} \cdot \sin(\chi_{WIND}-\chi) = 0 \quad \text{(a19)}$$

$$v_G = v_{TAS} \cdot \cos(\chi_{TAS}-\chi) + v_{WIND} \cdot \cos(\chi_{WIND}-\chi) \quad \text{(a20)}$$

Once the ground "$v_G$" speed is obtained, it is introduced in the following algorithm in order to calculate the range flown by the aircraft for a given fuel load:

$$R = -\int_{m_0}^{m_i} dr/dm\, dm = \int_{W_0}^{W_i} \frac{1}{g_0} \cdot \frac{V_G}{F} \cdot dW \quad \text{(a21)}$$

$$R = \int_{W_0}^{W_i} \frac{1}{\delta} \cdot \frac{L_{HV}}{g_0^2 \cdot m_{MTOW}} \cdot \frac{M \cdot \cos(\chi_{TAS}-\chi) + M_{WIND} \cdot \cos(\chi_{WIND}-\chi)}{C_F(M, C_T)} \cdot dW \quad \text{(a22)}$$

$$R = \int_{W_0}^{W_i} \frac{1}{\delta} \cdot \frac{L_{HV}}{g_0^2 \cdot m_{MTOW}} \cdot \frac{M \cdot \cos(\chi_{TAS}-\chi) + M_{WIND} \cdot \cos(\chi_{WIND}-\chi)}{C_F[M, C_T(M, C_W)]} \cdot dW \quad \text{(a23)}$$

For a constant altitude cruise, in which the atmospheric pressure "δ" is fixed, the above equation can be converted into:

$$R = \int_{C_{W0}}^{C_{Wi}} \frac{L_{HV}}{g_0} \cdot \frac{M \cdot \cos(\chi_{TAS}-\chi) + M_{WIND} \cdot \cos(\chi_{WIND}-\chi)}{C_F[M, C_T(M, C_W)]} \cdot dC_W \quad \text{(a24)}$$

$$R = \int_{C_{W0}}^{C_{Wi}} f[C_W, M(C_W), M_{WIND}(C_W), |\chi_{WIND}-\chi|(C_W)] \cdot dC_W \quad \text{(a25)}$$

With the assumption that the wind intensity and its angle with respect to the aircraft path do not depend on the weight coefficient "$C_W$", this is, they do not vary as the aircraft moves along its trajectory, the variational calculus Euler-Lagrange theorem allows the reduction of the integral problem into a point problem:

$$R = \int_{C_{W0}}^{C_{Wi}} f[C_W, M(C_W), M_{WIND}, |\chi_{WIND}-\chi|] \cdot dC_W \quad \text{(a26)}$$

$$\frac{\partial f}{\partial M}[C_W, M(C_W), M_{WIND}, |\chi_{WIND}-\chi|] = \quad \text{(a27)}$$

$$0 \to M_{OPTIMUM}(C_W, M_{WIND}, |\chi_{WIND}-\chi|)$$

The optimum Mach number "$M_{OPTIMUM}$" that results in the maximum range is the result of continuously flying the instantaneous Mach number that maximizes the functional "f". With the drag polar (a6) and the fuel consumption (a18) dependencies taken from the aircraft performance model, the above equation (a27) can be easily solved.

To obtain the maximum range, the aircraft may continuously execute this algorithm, which provides the instantaneous Mach number as a function of the weight coefficient, the wind Mach number and the absolute value of the bearing difference between the wind and the aircraft path.

Figure 2:
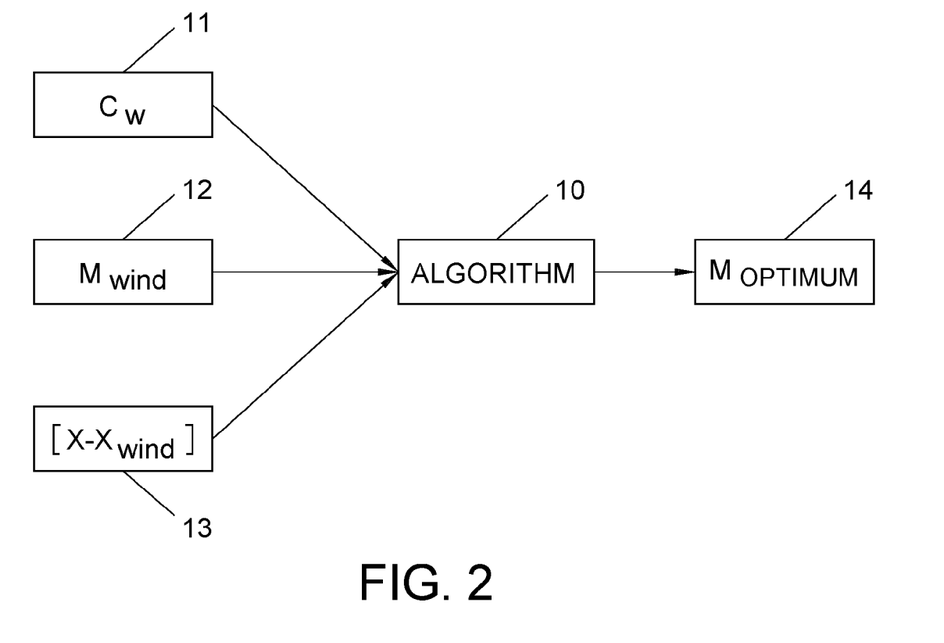
FIG. 2 is a schematic flow diagram of a particular embodiment of a method for calculating an optimum maximum range cruise speed of an aircraft, showing various parameters utilized by the method.

FIG. 2 shows a schematic block diagram of the most general phases of the particular example of an embodiment of the method for calculating an optimum maximum range cruise speed in an aircraft, disclosed in the previous paragraphs. Specifically the parameters that are dynamically and continuously calculated in the algorithm (10) that is executed by the FMS are: the weight coefficient "$C_W$" (11), the Wind mach number "$M_{WIND}$" (12) and the absolute value of the difference between the wind bearing and the aircraft bearing "X-$X_{WIND}$" (13). As a result of the execution of the algorithm (10) the optimum Aircraft Mach number "$M_{OPTIMUM}$" is obtained (14).

In this particular example, the weight coefficient is calculated by the FMS as the division of the weight of the aircraft (including the fuel weight) by the atmospheric pressure. Both parameters, the weight of the aircraft and the atmospheric pressure previously, may be continuously and dynamically measured by the measurement system of the aircraft (onboard sensors and external providers). In turn, the Wind Mach number may be calculated by the FMS as the wind speed divided by the speed of sound, these parameters being previously, continuously and dynamically measured and provided by the measurement system of the aircraft. The absolute value of the difference between the wind bearing and the aircraft bearing is also calculated by the FMS, the wind bearing "$\chi_{TAS}$" and the aircraft bearing "$\chi$" being previously, continuously and dynamically measured by the measurement system of the aircraft.

Embodiments of the methods disclosed may include modeled or simulated parameters as well as measured parameters. For example, in various embodiments, the fuel load of the aircraft may be simulated or estimated based on models of fuel consumption and aircraft performance if measured parameters are unavailable. In ground based simulation environments or due to unavailability of measured parameters, modeled or simulated parameters may be substituted for the measured parameters described herein.

Further, embodiments of the methods disclosed may include a computer programmed to operate in accordance with the methods described herein. The computer may be air-based or land-based. For example, an air-based computer may be associated with an aircraft's flight management system that controls the aircraft on the basis of a calculated optimum maximum range cruise speed. In another example, a land-based computer system may be located at an air traffic control facility or a mission planning facility for use in ground based trajectory prediction or simulation. The computer may include a processor and a memory for a computer program, that when executed causes the processor to operate in accordance with the methods described herein. The computer program may also be embodied in a computer readable medium having stored therein the computer program.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method for calculating an optimum maximum range cruise speed of an aircraft, capable of flight at an altitude, the method comprising:
receiving a plurality of flight parameters including at least a weight of the aircraft, an aircraft bearing, an atmospheric pressure, an atmospheric temperature, a wind speed, and a wind bearing at the altitude of the aircraft;
calculating a weight coefficient of the aircraft based on at least the weight of the aircraft and the atmospheric pressure at the altitude of the aircraft;
calculating a wind Mach number;
calculating an absolute value of a difference between the wind bearing and the aircraft bearing;
and calculating an optimum Mach number of the aircraft, wherein the optimum maximum range cruise speed is equal to the optimum Mach number multiplied by the speed of sound, wherein the calculation of the optimum Mach number comprises the weight coefficient, the wind Mach number, and the absolute value of the difference between the wind bearing and the aircraft bearing; and
sending the optimum Mach number of the aircraft to an aircraft guidance and control system and controlling an instant speed of the aircraft to the optimum maximum range cruise speed.

2. The method according to claim 1, wherein a fuel load of the aircraft is dynamically and continuously measured to calculate the weight of the aircraft.

3. The method according to claim 1, wherein the atmospheric pressure at the altitude of the aircraft is dynamically and continuously measured to calculate the altitude of the aircraft.

4. The method according to claim 1, wherein the calculation of the optimum Mach number further comprises considering a realistic drag polar that includes compressibility effects and fuel consumption dependencies with aircraft speed and aircraft thrust.

5. The method according to claim 4, wherein the calculation of the optimum Mach number further comprises determining an instantaneous optimum Mach number as a function of the weight coefficient, the wind Mach number, and the absolute value of the bearing difference between the wind and the aircraft path.

6. The method according to claim 1, wherein the method is dynamically and continuously carried out.

7. The method according to claim 1, wherein calculating the weight coefficient comprises division of the weight of the aircraft by the atmospheric pressure at the altitude of the aircraft.

8. The method according to claim 7, wherein calculating the wind Mach number comprises division of the wind speed by the speed of sound.

9. The method according to claim 1, wherein the calculating of the optimum Mach number comprises using the following equation:

$$R = \int_{C_{W0}}^{C_{Wi}} \frac{M\cos(x_{TAS} - x) + M_{WIND}\cos(|x_{WIND} - x|)}{\frac{F}{m_{MTOW}a_0\delta\sqrt{\theta}}} dC_W$$

wherein R is the aircraft range, $C_W$ is the weight coefficient of the aircraft, $|x_{WIND}-x|$ is the absolute value of the difference between the wind bearing and the aircraft bearing, M is a current Mach number of the aircraft, $x_{TAS}$ is an airspeed yaw angle, x is a ground speed yaw angle, $M_{WIND}$ is the wind Mach number, $x_{WIND}$ is a wind speed yaw angle, $m_{MTOW}$ is a maximum takeoff weight of the aircraft, $a_0$ is a standard speed of sound at mean sea level, F is an instant fuel consumption of the aircraft, $\delta$ is an atmospheric pressure ratio, and $\theta$ is an atmospheric temperature ratio.

10. The method according to claim 1, further comprising sending the optimum Mach number of the aircraft as calculated to a ground trajectory predictor, wherein the ground trajectory predictor comprises a land-based computer configured to predict a trajectory of the aircraft at the optimum Mach number.

11. An aircraft, capable of flight at an altitude, the aircraft comprising:
an engine, configured to generate thrust for the aircraft;
a guidance and control system configured to control a speed of the aircraft by controlling the thrust generated by the engine; and
a flight management system comprising a computer programmed to execute the operations of:
receiving a plurality of flight parameters including at least a weight of the aircraft, an aircraft bearing, an atmospheric pressure, an atmospheric temperature, a wind speed, and a wind bearing at the altitude of the aircraft;
calculating a weight coefficient of the aircraft based on at least a weight of the aircraft and the atmospheric pressure at the altitude of the aircraft;
calculating a wind Mach number;
calculating an absolute value of a difference between the wind bearing and the aircraft bearing; and
calculating an optimum Mach number of the aircraft, wherein the optimum maximum range cruise speed is equal to the optimum Mach number multiplied by the speed of sound, wherein the calculation of the optimum Mach number comprises the weight coefficient, the wind Mach number, and the absolute value of the difference between the wind bearing and the aircraft bearing;
wherein the guidance and control system controls the speed of the aircraft to the optimum maximum range cruise speed.

12. The aircraft according to claim 11, wherein the calculation of the optimum Mach number further comprises considering a realistic drag polar that includes compressibility effects and fuel consumption dependencies with aircraft speed and aircraft thrust.

13. The aircraft according to claim 12, wherein the calculation of the optimum Mach number further comprises determining an instantaneous optimum Mach number as a function of the weight coefficient, the wind Mach number, and the absolute value of the bearing difference between the wind and the aircraft path.

14. The aircraft according to claim 11, wherein calculating the optimum Mach number comprises using the following equation:

$$R = \int_{C_{W0}}^{C_{Wi}} \frac{M\cos(x_{TAS} - x) + M_{WIND}\cos(|x_{WIND} - x|)}{\frac{F}{m_{MTOW} a_0 \sqrt{\theta}}} dC_W$$

wherein R is the aircraft range, $C_W$ is the weight coefficient of the aircraft, $|x_{WIND}-x|$ is the absolute value of the difference between the wind bearing and the aircraft bearing, M is a current Mach number of the aircraft, $x_{TAS}$ is an airspeed yaw angle, x is a ground speed yaw angle, $M_{WIND}$ is the wind Mach number, $x_{WIND}$ is a wind speed yaw angle, $m_{MTOW}$ is a maximum takeoff weight of the aircraft, $a_0$ is a standard speed of sound at mean sea level, F is an instant fuel consumption of the aircraft, δ is an atmospheric pressure ratio, and θ is an atmospheric temperature ratio.

15. A flight management system of an aircraft, capable of flight at an altitude, the flight management system comprising a computer programmed to execute the operations of:
receiving a plurality of flight parameters including at least a weight of the aircraft, an aircraft bearing, an atmospheric pressure, an atmospheric temperature, a wind speed, and a wind bearing at the altitude of the aircraft;
calculating a weight coefficient of the aircraft based on at least a weight of the aircraft and the atmospheric pressure at the altitude of the aircraft;
calculating a wind Mach number;
calculating an absolute value of a difference between the wind bearing and the aircraft bearing; and
calculating an optimum Mach number of the aircraft, wherein the optimum maximum range cruise speed is equal to the optimum Mach number multiplied by the speed of sound, wherein the calculation of the optimum Mach number comprises the weight coefficient, the wind Mach number, and the absolute value of the difference between the wind bearing and the aircraft bearing;
wherein the flight management system further comprises a guidance and control system that controls an instant speed of the aircraft to the optimum maximum range cruise speed; and
calculating the optimum Mach number comprises using the following equation:

$$\int_{C_{W0}}^{C_{Wi}} \frac{M\cos(xtas - x) + M wind \frac{\cos(|Xwind - X|)}{F}}{Mmtow\, Ao\delta \sqrt{Theta}} dCw = R$$

wherein R is the aircraft range, $C_W$ is the weight coefficient of the aircraft, $|x_{WIND}-x|$ is the absolute value of the difference between the wind bearing and the aircraft bearing, M is a current Mach number of the aircraft, $x_{TAS}$ is an airspeed yaw angle, x is a ground speed yaw angle, $M_{WIND}$ is the wind Mach number, $x_{WIND}$ is a wind speed yaw angle, $m_{MTOW}$ is a maximum takeoff weight of the aircraft, $a_0$ is a standard speed of sound at mean sea level, F is an instant fuel consumption of the aircraft, δ is an atmospheric pressure ratio, and θ is an atmospheric temperature ratio.

16. The flight management system according to claim 15, wherein the calculation of the optimum Mach number further comprises considering a realistic drag polar that includes compressibility effects and fuel consumption dependencies with aircraft speed and aircraft thrust.

17. The flight management system according to claim 16, wherein the calculation of the optimum Mach number further comprises determining an instantaneous optimum Mach number as a function of the weight coefficient, the wind Mach number, and the absolute value of the bearing difference between the wind and the aircraft path.

18. The flight management system according to claim 15, wherein the computer dynamically and continuously executes the operations.

* * * * *

UNITED STATES PATENT AND TRADEMARK OFFICE
CERTIFICATE OF CORRECTION

PATENT NO.       : 10,086,948 B2
APPLICATION NO.  : 15/059037
DATED            : October 2, 2018
INVENTOR(S)      : Eduardo Gallo Olalla Page 1 of 1

It is certified that error appears in the above-identified patent and that said Letters Patent is hereby corrected as shown below:

In the Claims

Column 16, Line 35:

$$\int_{c_{Wo}}^{c_{Wi}} \frac{M \cos(xtas - x) + Mwind \frac{\cos(|Xwind - X|)}{F}}{MmtowAo\delta\sqrt{Theta}} dC_W = R$$

Should read:

$$R = \int_{C_{W0}}^{C_{Wi}} \frac{M \cos(x_{TAS} - x) + M_{WIND} \cos(|x_{WIND} - x|)}{\frac{F}{m_{MTOW} a_0 \delta \sqrt{\theta}}} dC_W$$

Signed and Sealed this
Eleventh Day of June, 2019

Andrei Iancu
*Director of the United States Patent and Trademark Office*